426-607 SR
12/1/81 XR T.101.304

United States Defensive Publication [19] (H) [11] T101,304
Musser [43] Dec. 1, 1981

[54] VISCOSITY REDUCING AGENTS FOR CHOCOLATE COATING COMPOSITIONS

[76] Inventor: Jay C. Musser, 214 Marietta Ave., Mount Joy, Pa. 17552

[21] Appl. No.: 136,863

[22] Filed: Apr. 3, 1980

[51] Int. Cl.[3] ..... A23G 3/00
[52] U.S. Cl. ..... 426/611; 426/613; 426/654; 426/662; 426/653; 426/631; 426/607; 426/659; 252/356

[57] ABSTRACT

Disclosed are combinations of lecithin and diacetyl tartaric acid esters of monoglycerides used in chocolate coating compositions to lower the viscosity thereof when in liquid form. Use of these substances does not adversely affect the physical properties such as gloss, softness, taste, etc.

9 Claims, No Sheets Drawing,

17 Pages Specification

The file of this unexamined application may be inspected and copies thereof may be purchased (849 O.G. 1221, Apr. 9, 1968).